United States Patent [19]

Lefebvre

[11] Patent Number: 4,964,388

[45] Date of Patent: Oct. 23, 1990

[54] METHOD AND DEVICE FOR REGULATING A CONTROLLED IGNITION ENGINE FROM THE STATISTIC DISTRIBUTION OF AN ANGULAR DIVERGENCE

[75] Inventor: Claude Lefebvre, Sartrouville, France

[73] Assignee: Institut Francais du Petrole, Rueil Malmaison, France

[21] Appl. No.: 212,691

[22] Filed: Jun. 28, 1988

[30] Foreign Application Priority Data

Jun. 30, 1987 [FR] France .................. 87 09264

[51] Int. Cl.$^5$ .................. F02D 41/14
[52] U.S. Cl. .................. 123/435
[58] Field of Search .................. 123/425, 435

[56] References Cited

U.S. PATENT DOCUMENTS

| | | | |
|---|---|---|---|
| 4,465,046 | 8/1984 | May | 123/425 |
| 4,519,366 | 5/1985 | May | 123/435 |
| 4,557,236 | 12/1985 | Showalter | 123/435 |
| 4,715,341 | 12/1987 | Douaud et al. | 123/425 |

FOREIGN PATENT DOCUMENTS 2105408  3/1983  United Kingdom ......... 123/425

*Primary Examiner*—Andrew M. Dolinar
*Attorney, Agent, or Firm*—Antonelli, Terry, Stout & Kraus

[57] ABSTRACT

A method and device for adjusting at least one parameter conditioning at least partially the operation of an internal combustion engine with controlled ignition, this technique using the detection of the passage of the flame front in the combustion chamber. From the distribution or histogram based on several of these angular divergences corresponding to a predetermined number of cycles n, a magnitude is elaborated or determined for controlling the operation of the engine and the parameter conditioning the operation of the engine is modified so that the control magnitude takes on a predetermined value.

6 Claims, 2 Drawing Sheets

METHOD AND DEVICE FOR REGULATING A CONTROLLED IGNITION ENGINE FROM THE STATISTIC DISTRIBUTION OF AN ANGULAR DIVERGENCE

BACKGROUND OF THE INVENTION

The present invention relates to a method and device for checking at least one parameter at least partially conditioning the operation of an internal combustion engine with controlled ignition from detection of the flame front.

The present invention is particularly well adapted for controlling the richness of a fuel-oxydent mixture such as air fuel delivered to a control ignition engine, and particularly a weak mixture.

In fact, at the present time, there exist few means for controlling the correct operation of a control ignition engine fed with weak mixture and particularly for controlling the combustion stability thereof and, consequently, the operating stability.

The present invention may also provide a control means for controlling the rate of recycling the exhaust gases.

SUMMARY OF THE INVENTION

Thus, the present invention provides a method for adjusting at least one parameter conditioning at least partially the operation of a controlled ignition internal combustion engine. According to this method, the passage of the flame front in the combustion chamber of at least one cylinder is detected, and the angular divergence between an angular reference position and the angular position at which detection of the flame front occurs is determined. From the distribution or histogram coming from several of the angular divergences corresponding to a predetermined number of cycles n, a magnitude is elaborated or determined for controlling the operation of the engine and the parameter is modified conditioning the operation of the motor so that the control magnitude takes on a predetermined value.

The predetermined number of cycles may, for example, be equal to 32 or 64 cycles.

The parameter at least partially conditioning the operation of the engine may be related to the richness of the fuel-oxydent mixture delivered to the engine.

The magnitude for controlling the operation of the engine may correspond to the evolution of at least one of the following values:
the mean value of said angular divergence;
the typical divergence or variance of the above defined mean;
the maximum value of the distribution of the angular divergences;
the value of the distribution of the angular divergences for a given crankshaft angle;
the angular spread of the distribution of the angular divergences;
the value of the angle beyond which a fixed number of detections of the flame front is made.

The angular reference position may correspond to the moment of energization of the spark plug.

When the method of invention is applied to an engine having several cylinders, the parameter for each of the cylinders may be adjusted from detection of the flame front in one and the same cylinder.

Similarly, this parameter may be adjusted for each of the cylinders from detection of the flame front in each of the cylinders respectively.

The present application also provides a device for implementing the method of the invention. This device comprises at least one ionization probe, means for measuring the angular divergence and means for statistically processing the angular divergence.

BRIEF DESCRIPTION OF THE DRAWINGS

The present invention will be better understood and its advantages will be clear from the following description of examples, more particularly adapted to adjusting the richness of the air-petrol mixture delivered to a control ignition engine.

DESCRIPTION OF THE PREFERRED EMBODIMENT

In the example chosen, for a cylinder or considered cylinder, and for each cycle thereof, the angular divergences measured between a reference position corresponding to the moment of energization of the sparkplug of the cylinder, or moment of ignition of the considered cylinder, and the detection of the passage of a flame front at a predetermined position in the combustion chamber where a probe is placed for detecting the flame front, such as a ionization probe, a very low inertia temperature sensor, etc.

Figure 1:
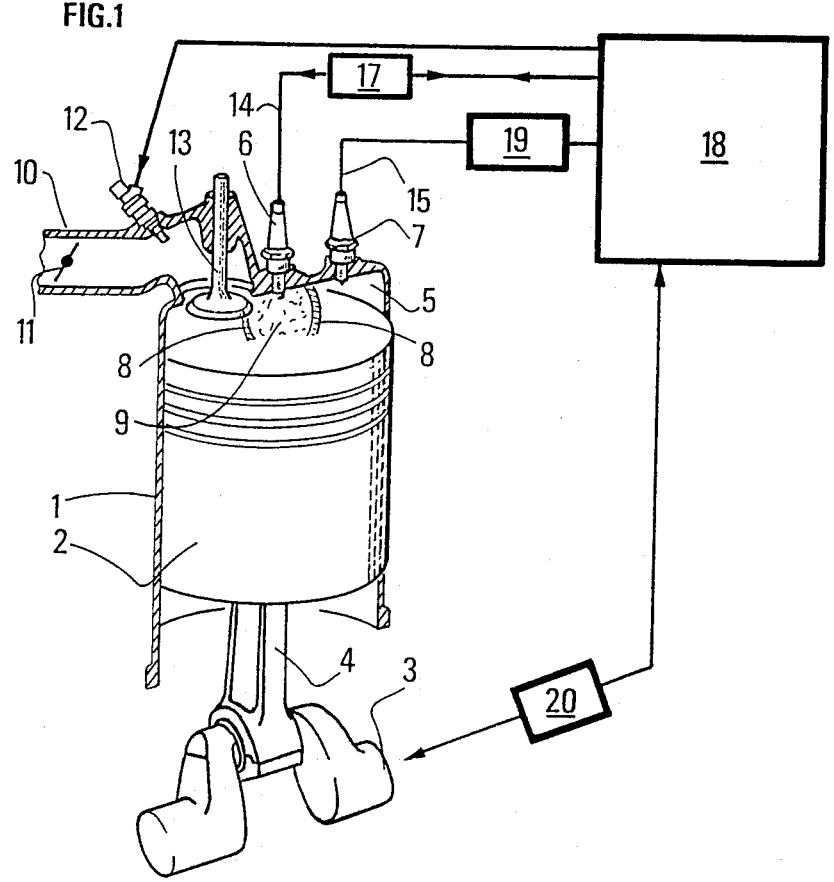
FIG. 1 shows the cylinder of an engine equipped with an ionization probed.

As shown in FIG. 1 an engine comprises a cylinder 1 which cooperates with a piston 2 connected to the crankshaft 3 by a connection rod 4.

The combustion chamber 5 of this cylinder comprises a sparkplug 6 and an ionization probe 7, with the ionization probe 7 detecting the flame front schematized at 8, the zone 9 corresponds to the burnt mixture portion.

References 10, 11, 12 and 13 designate respectively the intake pipe, the butterfly valve controlling the flow of gas penetrating into the engine, fuel injection and the intake valve.

Reference 14 designates the high voltage wire for supplying spark plug 6 which is connected to the ignition system 17. This system delivers the moment of ignition to computing and control means 18.

Reference 15 designates the cable detecting the passage of the flame front 8. The detection signal is transmitted to computing and control means possibly via analog pulsating means 19 integrated in the computing and control means 18.

The means for detecting the flame front 8 as well as the means for detecting the angular position 20 and measuring the angular divergences will not be described in the present application, since they are well-known to a man skilled in the art. Reference may be made to the French patent applications FR-2.337.261 and FR-2.432.097.

Figure 2:
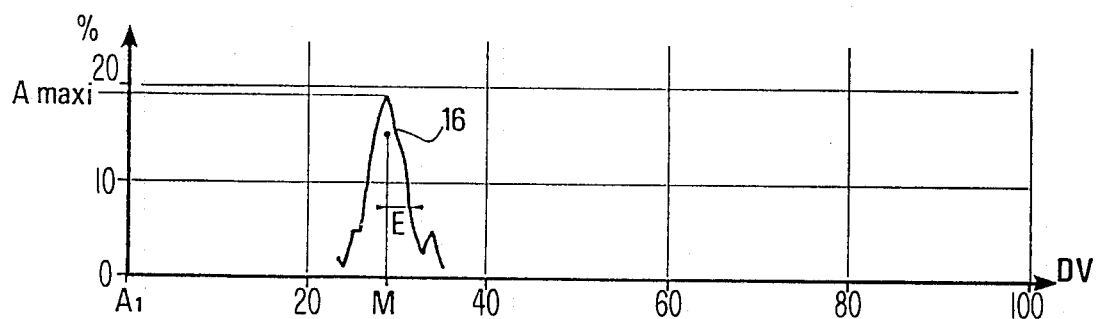
FIG. 2 shows one example of distirbution of the angular divergences.

From the acquisition of the ignition times and detection of the flame front 8 by the ionization probe 7, it is easy to calculate the propagation time of the flame front 8 between the spark plug 6 and the ionization probe or the angular divergence. For the same operating point of the engine, the distribution of this angular divergence over a certain number of consecutive cycles of the same cylinder 1 may be plotted on a graph. FIG. 2 shows one example of such distribution over 32 consecutive cycles, this distribution being referenced from the ignition time A1. It is recalled that the detection contemplated is defined by the first angle of appearance of the flame front 8 in line with the ionization probe 7. The angular divergence is plotted as abscissa in crankshaft degrees and the percentage of appearance in ordinates. Line 16 in the graph of FIG. 2 shows the distirbution of the angular divergences. The value M represents the mean angular divergence and the value of segment E, the typical divergence. In FIGS. 3A to 3E, the distributions are shown obtained with constant engine torque, as a function of the richness of the fuel/oxydent mixture. The respective richnesses shown in FIGS. 3A to 3E are: 0.98; 0.91; 0.81; 0.75; 0.66.

In FIGS. 3A to 3E, the reference A1 indicates the moment of ignition; references M and E the mean and the typical divergence, respectively.

It can be seen in these figures that as the richness decreases, the distribution of the angular divergences is offset towards the increasing abscissa, as was observed for numerous loads and speeds.

Similarly, it can be seen that the maximum point decreases as the richness decreases.

It will also be noted that the typical divergence E increases whereas the richness decreases.

It will also be noted that the distribution of the angular divergences spreads out more and more when the richness decreases.

Figure 3A:
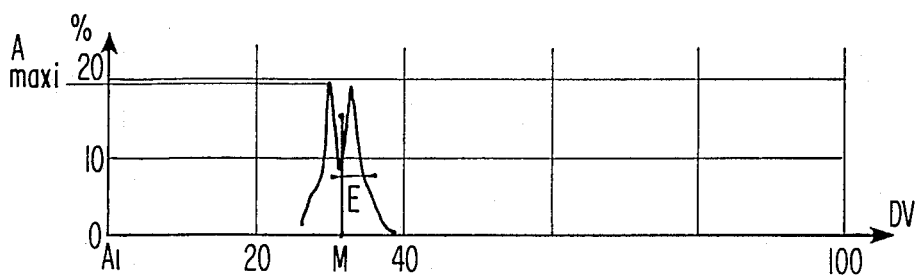
FIGS. 3A to 3E show the evolution of the angular distribution curve as a function of the evolution of the fuel-oxydent richness.
Figure 3B:
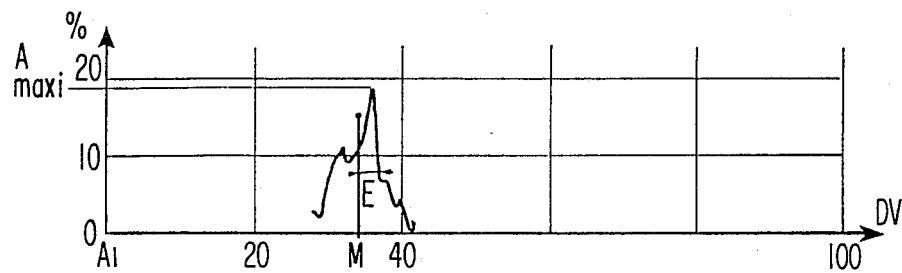
Figure 3C:
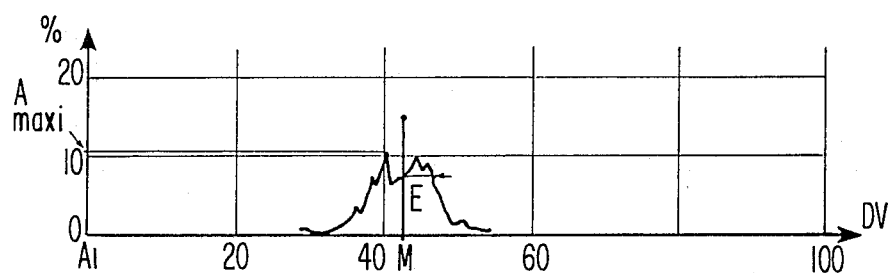
Figure 3D:
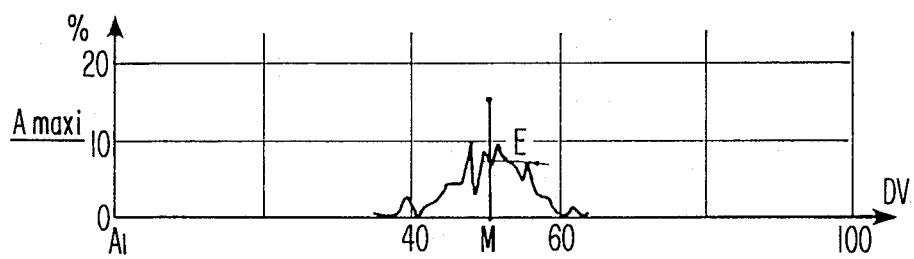
Figure 3E:
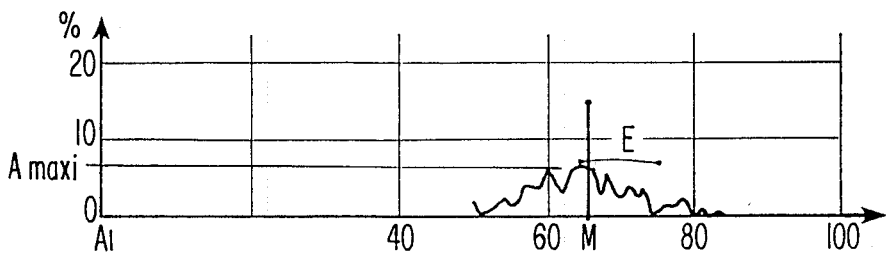

In effect, in FIG. 3A, the distribution occupies fifteen crankshaft degrees or so, whereas, in FIG. 3E it occupies about thirty crankshaft degrees.

Thus, it is clear from the distribution of the angular divergences that several magnitudes may be elaborated for taking into account the operating conditions of the engine.

Thus, among the magnitudes which may be used, the following may be mentioned:

1. Evolution of the mean value of the distribution of the probe signals (M),
2. Evolution of the typical divergence of the above defined mean (E),
3. Evolution of the maximum value of the disbribution of the probe signals (A MAXI),
4. Evolution of the value of the distribution of the probe signals (expressed in detection percentage for example) at certain fixed angles, for example 40°, corresponding to the frequency for a given angle.
5. Evolution of the angular spread of the distribution of the probe signals,
6. Evolution of the angle (the origin being the moment of ignition) beyond which a fixed number of detections appears, for example, evolution of the angle beyond which there is appearance of one and only one detection.

It can thus be noted that the possibilities of choosing a criterion become numerous. In fact, all sorts of combinations of the evolutions of the different parameters as well as of their statistical elements, may be imagined. As a first step, the variation of a single parameter may be chosen which will possibly be completed by other information, if necessary, during tuning of the engine.

The last magnitude numbered 6 offers good sensitivity of the detection, in particular by taking into account the angular divergence beyond which there is appearance of a single detection.

Good results have been obtained with this configuration by fixing an angular window at 75° of the crankshaft from the moment of ignition with a distribution over 32 successive cycles.

By angular window is meant the angular interval beginning at the ignition time or angle and which ends or is closed at a given crankshaft angle or, which is equivalent, which has a given angular amplitude, in the preceding example it is a question of an angular amplitude of 75°.

This configuration may be used by defining an angular window following tuning tests and then adjusting the richness so that, for example, over 32 successive detections there is only a single one which is outside.

If there is none, the mixture may be weakened, if there are several it will need to be made richer.

This is in no wise limiting and the number of detections made beyond a given angular window may be different from 1.

Tests have given satisfactory results, particularly, by considering 6 detections for an angular window of 60°. Furthermore, such a configuration makes it possible to better appreciate the discrepancy of the actual operating parameters of the engine with respect to the desired adjustments and to obtain these rapidly. Thus, if the number of detections beyond the angular window of 60° is zero, the engine adjustment may be varied rapidly (for example, so as to considerably weaken the mixture delivered to the engine). From the first detection beyond this angular window, the speed of adjusting the engine will be reduced (for example, the mixture will weakened more slowly) so as to better control the approximation of the desired adjustment parameters.

So as to avoid pumping phenomena about the desired operating points of the engine, intervals or ranges of values may be introduced, for example, over the number of detections, the angular windows thus introducing a hysteresis effect.

Thus, in the example mentioned above, it may be considered that the desired adjustment is reached if between four and six detections appear after the angular window of 60° of crankshaft, or for example if six detections were obtained after one at least of the angular windows whose closure is between 58 and 62° of the crankshaft.

The method of the present invention may be implemented by using electronic components, for example by means of a microprocessor of the "Monochip Intel 8751 H type".

Tests have shown that the signals produced by the ionization probe 7 are degraded when the richness decreases and that the analog processing of these signals should be reduced to a minimum. It is recommended to use comparators.

Still within the scope of the present invention, the computing and control system may adjust simultaneously several operating parameters of the engine, for example, and without this being a limitation, the richness of the mixture delivered to the engine and the moment of ignition.

What is claimed is:

1. A method for adjusting at least one parameter at least partially conditioning an operation of an internal combustion engine with controlled ignition, the method comprising the steps of:
   detecting a passage of a flame front in at least one cylinder of the internal combustion engine;

examining an angular divergence existing between an angular reference position and an angular position at which detection of the passage of the flame front occurs, said angular reference position corresponding to a moment of energization of a spark plug of the internal combustion engine;

determining a control magnitude from a distribution based on several angular divergences corresponding to a predetermining number of cycles of the internal combustion engine for controlling an operation of the internal combustion engine; and modifying the at least one parameter so that the control magnitude assumes a predetermined value, and wherein said control magnitude is determined in accordance with at least one of the following values;

a mean value of said angular divergence;

a typical divergence or variance of said mean value;

a maximum value of the distribution of the angular divergences;

a value of the distribution of angular divergences for a given crankshaft angle;

an angular spread of the distribution of the angular divergences; or a value of an angle beyond which a fixed number of detections of the flame front is noted.

2. The method as claimed in claim 1, wherein the number of cycles is equal to thirty-two.

3. The method as claimed in one of claims 2 or 1, wherein said at least one parameter is related to a richness of fuel-oxydent mixture delivered to the internal combustion engine.

4. The method as claimed in claim 1 applied to an internal combustion engine having a plurality of cylinders, wherein said at least one parameter is adjusted for each of the cylinders from detection of the flame front made in one and the same cylinder.

5. The method as claimed in claim 1 applied to an engine with a plurality of cylinders, wherein the at least one parameter is modified for each of the cylinders from the detection of the flame front in each of the respective cylinders.

6. A device for implementing the method as claimed in claim 1, the device comprising at least one ionization probe means for detecting the flame front, means for measuring the angular divergence, and means for statistically processing the angular divergence.

* * * * *